United States Patent [19]

Dufresne et al.

[11] Patent Number: 4,784,750

[45] Date of Patent: Nov. 15, 1988

[54] CATALYTIC CRACKING PROCESS

[75] Inventors: Pierre Dufresne, Rueil-Malmaison; Christian Marcilly, Houilles, both of France

[73] Assignee: Institut Francais Du Petrole, Rueil-Malmaison, France

[21] Appl. No.: 870,595

[22] Filed: Jun. 4, 1986

[30] Foreign Application Priority Data

Jun. 4, 1985 [FR] France ................................ 85 08528

[51] Int. Cl.$^4$ .............................................. C10G 11/05
[52] U.S. Cl. ...................................... 208/120; 502/64; 208/121; 208/124
[58] Field of Search ....................... 208/120, 121, 124; 502/79, 64

[56] References Cited

U.S. PATENT DOCUMENTS

| | | | |
|---|---|---|---|
| 3,812,199 | 5/1974 | Chen et al. ........................... | 585/708 |
| 3,944,482 | 3/1976 | Mitchell et al. ...................... | 208/120 |
| 4,120,825 | 10/1978 | Ward .................................... | 502/64 |
| 4,123,390 | 10/1978 | Sherman et al. ...................... | 502/79 |
| 4,197,186 | 4/1980 | Short et al. .......................... | 208/120 |
| 4,228,036 | 10/1980 | Swift et al. .......................... | 502/64 |
| 4,362,651 | 12/1982 | Schwarzenbek ...................... | 208/120 |
| 4,515,902 | 5/1985 | Shiori et al. ......................... | 208/120 |
| 4,588,496 | 5/1986 | Scherzer ............................... | 502/79 |
| 4,591,576 | 5/1986 | Chiang et al. ........................ | 502/64 |
| 4,632,749 | 12/1986 | Hilfman ............................... | 502/79 |
| 4,724,067 | 2/1988 | Raatz et al. .......................... | 208/120 |
| 4,738,940 | 4/1988 | Dufresne et al. ..................... | 502/66 |
| 4,738,941 | 4/1988 | Dufresne et al. ..................... | 502/66 |

FOREIGN PATENT DOCUMENTS 895873 3/1982 Belgium .

*Primary Examiner*—Anthony McFarlane
*Attorney, Agent, or Firm*—Millen & White

[57] ABSTRACT

The invention concerns a hydrocarbon cracking catalyst containing a mixture of amorphous matrix with a zeolite, the zeolite having a $SiO_2/Al_2O_3$ molar ratio ranging from about 8 to 70, a sodium content lower than 0.15% by weight, a parameter $a$ of elementary mesh from 24.55 to 24.24 $\times 10^{-10}$ m, a capacity $C_{Na}$ to retake sodium ions, expressed in grams of sodium per 100 grams of modified zeolite, higher than 0.85, a specific surface higher than 400 $m^2.g^{-1}$, a sodium ion uptake steam adsorption capacity at 25° C. (with a P/Po ratio of 0.10) higher than 6% by weight, a pore distribution such that from 1 to 20% of the pore volume is pores of a diameter ranging from 20 to $80.10^{-10}$ m, the remaining pore volume being essentially pores of a diameter lower than $20.10^{-10}$ m, the matrix being characterized by the following textural properties:

$S \geq 100\ m^2.g^{-1}$
$TPV \geq 0.4\ cm^3.g^{-1}$
$PV_{75} \geq 0.25\ cm^3.g^{-1}$
$PV_{75}/TPV \geq 0.5$

13 Claims, No Drawings

CATALYTIC CRACKING PROCESS

SUMMARY OF THE INVENTION

The present invention concerns a catalytic cracking process operated in the presence of a catalyst comprising, as constituents, at least one specially modified acid zeolite of Y type and at least one matrix of particular textural properties.

The present invention concerns the use of a new zeolite catalyst containing a zeolite whose physical characteristics and acidity have been specially modified and an amorphous matrix mainly consisting of alumina or of an oxides combination as hereinafter defined, and characterized particularly in that a substantial part of its porosity is given by pores of a diameter larger than 7.5 nm. This new type of catalyst exhibits an activity and a selectivity to middle distillates clearly improved as compared with the other systems of the prior art having zeolites as basic constituents.

The zeolite used in the catalyst (5 to 50% by weight) according to the present invention is an acid zeolite HY characterized by different specifications whose determination methods will be specified hereinafter: a $SiO_2/Al_2O_3$ molar ratio ranging from about 8 to 70, preferably from about 12 to 40; a sodium content lower than 0.15% by weight, determined on zeolite roasted at 1100° C.; a crystalline parameter $a_o$ of unit cell size ranging from $24.55 \times 10^{-10}$ m to $24.24 \times 10^{-10}$ m; and more preferably from $24.38 \times 10^{-10}$ m to $24.26 \times 10^{-10}$ m; a capacity $C_{Na}$ to retake sodium ions, expressed as grams of Na per 100 grams of modified, neutralized and roasted zeolite, higher than about 0.85 (the capacity $C_{Na}$ to retake sodium ions will be defined more precisely in the following paragraph); a specific surface, determined by the B.E.T. method, higher than about 400 $m^2.g^{-1}$ (preferably higher than 550 $m^2.g^{-1}$); a steam adsorption capacity at 25° C. for a partial pressure of 2.6 torrs (346.6 Pa) ($P/P_o=0.10$), higher than about 6% by weight, a micropore distribution, determined by B.J.H. method of bimodal type, comprising, in addition to the conventional structural porosity centered about a diameter of 0.8-0.9 nm, a secondary microporosity more widely distributed about an average value ranging from 1.5 to 8.0 nm and, preferably from 2.0 and 6.0 nm, said secondary porosity corresponding to 1-20% of the pore volume of the zeolite, as hereinafter defined.

These different characteristics are measured by the method specified hereinafter:

the $SiO_2/Al_2O_3$ molar ratio is measured by chemical analysis. When the aluminum amount becomes low, for example, more precisely, lower than 2%, it is advisable to use a method of determination by atomic adsorption spectrometry;

the unit cell parameter is calculated from the X-ray diffraction diagram according to the method described in ASTM Standard D 3.942-80. It is clear that, in order to proceed to a correct calculation, the crystallinity of the product must be sufficient;

the specific surface is determined from the nitrogen adsorption isotherm at the temperature of liquid nitrogen and calculated according to the conventional B.E.T. method. The samples are pretreated, before the measurement, at 500° C. under dry nitrogen scavenging;

the percentages of retaken water (or steam adsorption capacity) are determined by means of a conventional gravimetry apparatus. The sample is pretreated at 400° C. under vacuum, then brought to a stable temperature of 25° C. Then water is supplied at a pressure of 2.6 torrs (346.6 Pa), corresponding to a $P/P_o$ ratio of about 0.10 (ratio between the water partial pressure supplied to the apparatus and the saturation vapor pressure of water at a temperature of 25° C.);

the exchange capacity of sodium ions: $C_{Na}$ (or sodium ions) is determined as follows: one gram of zeolite is subjected to three successive exchanges in 100 $cm^3$ of 0.2M NaCl solution, for 1 hour at 20° C. under good stirring. The solutions are permitted at their natural pH during the exchange. As a matter of fact, when the pH is readjusted to a value close to 7, by addition of small hydroxide amounts, the exchange sodium rate is higher. It is expressed in sodium grams per 100 g of modified zeolite, reexchanged and roasted at 1100° C.:

the micropore distribution is determined by the B.J.H. method (BARRETT, JOYNER, HALENDA, J. of Am. Chem. Soc. Vol. 73.1951, p 373) based on the digital processing of the nitrogen desorption isotherm. The measurement is performed with a CARLO ERBA apparatus of the SORPTOMATIC type, set 1800. Here the zeolite total pore volume is defined as the volume of adsorbed nitrogen (on the desorption isotherm) at a nitrogen pressure corresponding to $P/P_o=0.99$;

these zeolites are generally manufactured from a NaY zeolite by suitable combination of two basic treatments: (a) a hydrothermal treatment associating temperature and steam partial pressure and, (b) an acid treatment, preferably with a strong and concentrated inorganic acid.

Generally the NaY zeolite from which is prepared the zeolite according to the invention has a $SiO_2/Al_2O_3$ molar ratio ranging from about 4 to 6; it would be advisable to previously decrease its sodium content (by weight) to a value lower than 3%, preferably lower than 2.8%; generally the NaY zeolite further has a specific surface ranging from about 750 to 950 $m^2/g$.

BACKGROUND OF THE INVENTION

In the various existing manufacturing methods, the hydrothermal treatment of the zeolite is always followed with an acid treatment. The hydrothermal treatments are well known in the art and provide so-called stabilized or even ultra-stabilized zeolites. Thus MAC DANIEL and MAHER have claimed in U.S. Pat. No. 3 293 192 the production of so-called ultrastable Y zeolites characterized by a crystalline parameter from $24.45 \times 10^{-10}$ m to $24.2 \times 10^{-10}$ m and by small sodium percentages, due to the association of hydrothermal treatments and cation exchanges with ammonium salts solutions, KERR et al. have also obtained Y zeolites of increased silica content by selective extraction of aluminum by means of a chelating agent such as tetraacetic ethylene diamine (U.S. Pat. No. 3,442,795).

EBERLY et al. have combined the two last techniques for obtaining dealuminated zeolites (U.S. Pat. No. 3,506,400 and U.S. Pat. No. 3,591,488). They show that the hydrothermal treatment consists of selectively extracting tetracoordinated aluminum from the aluminosilicate structure. They claim this procedure as well as the subsequent treatment with solutions containing different cations. One example consists in the subsequent extraction by 0.1N HCl, giving a faujacite no longer containing aluminum. (This example has however been later disputed by SCHERZER who could not obtain the so-described product (journal of Catalysis 54,285, 1978).

WARD describes the manufacture of zeolite catalysts intended for the manufacture of middle distillates (U.S. Pat. No. 3,853,742). The zeolite is stabilized but is not subjected to acid etching at the end of the series of treatments and its crystalline parameter ranges from 24.40 to $24.50 \times 10^{-10}$ m. BEZMAN and RABO have used, as basic material for hydrocracking catalysts, more strongly stabilized zeolites whose crystalline parameter varies from 24.20 to $24.45 \times 10^{-10}$ m (EP 0028938). This zeolite type is more particularly characterized by a ion exchange capacity "IEC" lower than 0.07. The ion exchange capacity IEC is defined in this patent as:

$$IEC = k \frac{Na_2O \text{ mol}}{SiO_2 \text{ mol}}$$

k being the $SiO_2/Al_2O_3$ molar ratio determined before the back exchange to $Na^+$ ions. A zeolite of $SiO_2/Al_2O_3$ molar ratio equal to k and of IEC value equal to 0.07 corresponds to the approximate formula:

$$H_{0.93}Na_{0.07}AlO_2(SiO_2)_{k/2}$$

The sodium ion uptake capacity in such a product is expressed, in % by weight, as:

$$C = \frac{23 \times 0.07}{(23 \times 0.07) + 0.93 + (59 + (60 \times 2^k))} \times 100$$

When k=4.8, $C_{Na}=0.78$
When k=10, $C_{Na}=0.45$

Hence, for an IEC value lower than or equal to 0.07, the retaking sodium ion capacity $C_{Na}$ is always lower than 0.8.

The zeolite ultra-stabilized by the BEZMAN and RABO method is also characterized by its hydrophobic character, such that its water adsorption capacity at 25° C., at a $P/P_o$ value of 0.1, be lower than 5%.

SCHERZER (Journal of catalysis 54, 285, 1978) synthesizes zeolites of very increased silica content ($SiO_2/Al_2O_3$ molar ratio $\geq 100$) by combination of hydrothermal and acid treatments, said zeolites being characterized by X-ray diffraction. At the same period, V. BOSACEK et al. also proceed to similar treatments for obtaining an ultra-stable zeolite having a $SiO_2/Al_2O_3$ ratio of about 75.

These products are too strongly dealuminated and, for this reason, their interest in cracking operations is doubtful. As a matter of fact, it is necessary to maintain a minimum number of aluminum atoms in the structure in order to maintain a sufficient acidity required for a cracking catalyst.

The Belgian Pat. No. 895 873 indicates the possibility of producing middle distillates by hydrocracking with the use of a catalyst containing Y zeolites treated with stream and then lixiviated. This ultra-stabilized zeolite is characterized by different parameters, particularly a $SiO_2/Al_2O_3$ molar ratio higher than 10, a crystalline parameter lower than $24.4 \times 10^{-10}$ m, a particular mesopore distribution. The porosity of an Y zeolite, non treated with steam and with an acid, is entirely pores of a diameter lower than $20 \times 10^{-10}$ m.

Ultra-stabilization treatments change this distribution. According to the Belgian Pat. No. 895 873, the described treatments generate a mesoporosity centered on about $80 \times 10^{-10}$ m for a zeolite treated with steam and about $135 \times 10^{-10}$ m for the same zeolite subsequently subjected to an acid treatment.

DETAILED DESCRIPTION

Now, it has been observed that the zeolites preferred as cracking catalysts components must have a medium acidity, i.e. a $SiO_2/Al_2O_3$ molar ratio ranging from about 8 to 70, preferably from 12 to 40, a crystallinity maintained in a proportion of 45%, corresponding to a specific surface of 400 m²/g, and preferably of 60%, corresponding to a specific of 550 m²/g, a pore distribution such that from 1 to 20%, preferably from 3 to 15% of the pore volume is pores of a diameter ranging from 20 to $80 \times 10^{-10}$ m, the remaining pore volume being essentially pores of a diameter lower than $20 \times 10^{-10}$ m.

The creation of "secondary microporosity" with pore diameters ranging from 20 to $80 \times 10^{-10}$ m, as well as the absence of mesoporosity beyond $80 \times 10^{-10}$ m, is a characteristic feature of the invention.

Said zeolite is shaped in a matrix which may, for example, be an alumina containing mesopores. There is thus preferably obtained a catalyst having a primary microporosity lower than $20 \times 10^{-10}$ m, due to the crystalline structure of the zeolite, a secondary microporosity ranging from 20 to $80 \times 10^{-10}$ m, due to the crystalline defects in the zeolite lattice and, finally, a mesoporosity due to the matrix with which the zeolite is admixed.

This type of ultra-stable zeolite is obtained by combination of hydrothermal treatments and treatments in aqueous phase with the two following provisions:

the stabilization hydrothermal treatments must be performed under relatively milder conditions than in conventional procedures of the prior art used to obtain the so-called ultra-stabilized zeolites, as disclosed by MAC DANIEL and MAHER (U.S. Pat. No. 3,293,192), or BEZMAN and RABO (EP No. 0028938) so that the Si/Al ratio of the aluminosilicate structure is not too high. A hydrothermal treatment is perfectly defined by the conjunction of three operating variables which are: temperature, time, steam partial pressure. The sodium ions content of the starting product is also important inasmuch as they partially block the dealumination process and favor the lattice destruction.

The optimum conditions of the hydrothermal treatment will be precisely stated hereinafter.

The preparation of the zeolite must end with a treatment in acid medium. It has been observed that this last step has a substantial effect on the acidity and the selectivity of a cracking catalyst whose basic constituent is a so-modified Y zeolite and a matrix.

This acid treatment of the stabilized zeolite has a sustantial effect on the physico-chemical properties of the zeolite.

The zeolite whose characteristics conform with the precedingly defined criteria is dispersed in a generally amorphous matrix having the following textural properties:

Total pore volume: $TPV \geq 0.4$ cm³.g⁻¹ and preferably $\geq 0.5$ cm³.g⁻¹

Specific surface: $S \geq 100$ m².g⁻¹ and preferably $\geq 150$ m².g⁻¹

Pore volume corresponding to pores of a diameter higher than 7.5 nm: $PV_{75} \geq 0.25$ cm³.g⁻¹ and preferably $\geq 0.35$ cm³.g⁻¹

$PV_{75}/TPV > 0.5$ and preferably $> 0.6$

This matrix has essentially the effect of facilitating the zeolite shaping as conglomerates, balls, extrudates, pellets, etc ... which can be placed in an industrial reactor. The matrix proportion in this catalyst is about 50 to 95% by weight.

It is obvious that the ideal textural characteristics (surface, TPV, $PV_{75}$) of the final catalyst cannot be defined with accuracy since they are closely related to the proportions of zeolite and matrix.

Different methods of preparation may be considered according to the desired type of product. Two main embodiments differ by the number of required hydrothermal treatments. For moderately stabilized products, i.e. those having a moderately dealuminated aluminosilicate structure, a single treatment is sufficient; for more highly stabilized products, two treatments become necessary. The prior art currently uses the values of the crystalline parameter to determine the stabilization degree.

The one or more hydrothermal treatments may be followed with one or more extractive treatments in solutions of organic or inorganic acid such as hydrochloric acid, nitric acid, sulfuric acid, perchloric acid, phosphoric acid, acetic acid, oxalic acid, formic acid or equivalent acids. It is also possible to use complexing agents as those of the prior art, such as tetraacetic ethylene diamine, acetylacetone or equivalent substances. However, the preferred treatments may be performed with solutions of hydrochloric or nitric acids at a normality from 0.1 to 11N, preferably form 0.5 and 3N. For maintaining the crystallinity of the zeolite it may be advantageous to proceed to several mild successive etchings, i.e. with acid solutions of low normality, rather than to a single etching under more severe conditions, i.e. with a concentrated acid; the so-described acid treatments may always be followed with or preceded by one or more conventional exchanges with ammonium salts in order to further reduce the sodium content of the final zeolite.

Thus the catalyst which can be used according to the invention contains:

(a) 50 to 95% of at least one matrix as above defined, selected from the groups consisting of silica aluminas, silica-magnesias and clays, with the optional addition into said matrix of at least one other solid selected from the group consisting of aluminas, silicas, zirconias, boron oxide alumina, magnesias, titanium oxide, (b) 5 to 50% of a zeolite as above defined, optionally further containing one or more metal elements of current use in cracking catalysts, particularly metals from the rare-earth family, the catalyst according to the invention also advantageously containing very small amounts, lower for example than 1000 ppm, of rhenium or of a noble metal from the platinum family (platinum, palladium, irridium, osmium, rhodium, ruthenium) and/or another metal (for example 0.01 to 5%), mainly as oxide, such as manganese, iron, cobalt, nickel, chromium etc ...

The general conditions of the catalytic cracking reactions are particularly well known and need not to be repeated here (see for example U.S. Pat. Nos. 3,293,192; 3,449,070; 4,415,438; 3,518,051; 3,607,043).

EXAMPLES

The following examples are given to illustrate more precisely the characteristics of the invention, but must not be considered as limiting the scope thereof.

EXAMPLE 1

Preparation of a stabilized HY zeolite treated with an acid

The starting zeolite is a NaY zeolite of formula $NaAlO_2(SiO_2)_{2.5}$, whose characteristics are:
$SiO_2/Al_2O_3$ molar ratio: 5
crystalline parameter: $24.69 \times 10^{-10}$ m
Steam adsorption capacity at 25° C. (at $P/P_0$: 0.1): 26%
Specific surface: 880 m²/g This zeolite is subjected to four successive exchanges with ammonium nitrate solutions at 2M concentration, at a temperature of 95° C., for 1 h30 and with a ratio of solution volume to the zeolite weight equal to 8. The sodium content of the obtained $NaNH_4$ zeolite is 0.95% by weight. This product is then quickly introduced in a furnace preheated at 770° C. and maintained for 4 hours in static atmosphere (hence in the absence of any gas scavenging). The zeolite is then subjected to an acid treatment in the following conditions: the ratio between the volume of 2N nitric acid and the solid weight is 6, the temperature is 95° C. and the time 3 hours. Then another treatment in the same conditions is performed, but with an acid of 0.3N normality. The $SiO_2/Al_2O_3$ molar ratio is then 18, the residual sodium content 0.1%, the crystalline parameter 24.32, the specific surface 805 m²/g, the capacity to retake water of 13.7%, the capacity-to retake sodium ions of 1.8% by weight; the proportion of the pore volume contained in pores of a diameter from 25 to $60 \times 10^{-10}$ m is 11%, the remaining pore volume being contained in pores of a diameter lower than $20 \times 10^{-10}$ m.

EXAMPLE 2

Preparation of a HY zeolite stabilized and treated with an acid

The NaY zeolite used in example 1 is subjected to two exchanges in solutions of ammonium chloride so as to obtain a sodium content of 2.5%. The product is then introduced in a cold furnace and roasted in dry air up to 400° C. At this temperature, water is introduced in the roasting atmosphere at a rate corresponding, after vaporization, to a partial pressure of 380 torrs (50661 Pa). The temperature is then brought to 565° C. for 2 hours. The product is then subjected to an exchange with a solution of ammonium chloride followed with a very well controlled acid treatment in the following conditions: ratio of 0.4N hydrochloric acid volume to the solid weight of 10, time of 3 hours. The sodium content then decreases to 0.6%, the $SiO_2/Al_2O_3$ ratio is 7.2. This product is then subjected to self-steaming at 780° C. for 3 hours, then taken again in acid solution by 2N hydrochloric acid and with a volume ratio of solution to the zeolite weight of 10. The crystalline parameter is $24.28 \times 10^{-10}$ m, the specific surface 825 m²/g, the capacity to retake water 11.7 and the capacity to retake sodium ions of 1.2% by weight. The sodium content is 0.05% by weight and the percent of pore volume contained in pores of a diameter from 2 to 6 nm is 13%, the remaining pore volume being contained in pores of a diameter lower than $20 \times 10^{-10}$ m.

EXAMPLE 3

Preparation of cracking catalysts A, $A_1$ and B, from the zeolite of example 1.
CATALYST A A silica-alumina containing by weight 75% of SiO$_2$-25% of Al$_2$O$_3$ is prepared by the successive following steps:

(1) neutralization of a sodium silicate solution by NO$_3$H, (2) washing of the obtained silica gel, (3) addition of an aluminum nitrate solution to the silica gel suspension, (4) addition of ammonia to precipitate the aluminum hydroxide, (5) washing and filtration of the obtained silica-alumina gel to remove a maximum of undesirable ions (Na$^+$, NO$_3^-$).

The catalyst A is prepared by carefully incorporating the zeolite of example 1 in the so-obtained silica-alumina, by mixing the resultant composition and extruding it through a drawing plate of 1.6 mm diameter and then by roasting the extrudates at 500° C. for 2 hours, with a temperature increase rate of 2.5° C. per minute. The obtained carrier is then impregnated in two successive steps with an ammonium heptamolybdate solution, then with nickel nitrate (a two-hour roasting at 400° C. being performed between these two steps). The catalyst is finally roasted at 500° C. for 2 hours.

The pure silica-alumina obtained in this example, mixed and extruded in the same conditions as for the catalyst carrier A, has the following textural characteristics, conforming with the invention:

S = 440 m$^2$.g$^{-1}$
TPV = 0.9 cm$^3$.g$^{-1}$
PV$_{75}$ = 0.56 cm$^3$.g$^{-1}$
PV$_{75}$/TPV = 0.62
Na = 0.026% by weight The catalyst A contains 25% by weight of zeolite and 75% of silica-alumina. It is subjected to a hydrothermal treatment in order to reduce its activity: 17 hours at 750° C. under a steam partial pressure of 1 bar (0.1 MPa).

CATALYST A$_1$(comparative)

Catalyst A$_1$ is prepared in conditions and according to a method comparable with that of catalyst A, but with a modification of the silica-alumina synthesis technique so as to improve the combination of aluminum and silicon oxides. In order to obtain this result, the steps of maturation and silica gel washing, in particular, may be shortened to avoid or limit the ageing of the latter; alumina may be precipitated very slowly by progressive ammonia addition so as to limit the local heterogeneities of composition which favor the formation of large alumina particles not much combined to silica; finally the silica-alumina gel obtained between 50° and 80° C. may be matured for several hours in order to improve the oxides combination.

The so-obtained pure silica-alumina, used here for preparing catalyst A$_1$, has been mixed, extruded and roasted in the same conditions as the carrier of example A. It has the following textural characteristics (PV$_{75}$/TPV not conforming with the invention):

S = 518 m$^2$.g$^{-1}$
TPV = 0.78 cm$^3$.g$^{-1}$
PV$_{75}$ = 0.32
PV$_{75}$/TPV = 0.40
Na = 0.0032% by weight

CATALYST B 10 g of the HY zeolite obtained at the end of example 1 are dipped into 100 cm$^3$ of 0.5M aqueous solution of lanthanum nitrate for 2 hours at room temperature. The product is then washed with distilled water, dried at 150° C. for 4 hours, then roased for 2 hours at 500° C. It is finally dispersed, as for the preparation of catalyst A and in the same proportions, in silica-alumina powder and subjected to the same hydrothermal treatment as precedingly described.

EXAMPLE 4

The performances of catalyst A are determined in a test of fixed bed cracking of a vacuum gas oil in the following conditions:

| | |
|---|---|
| Catalyst amount: | 4.0 g |
| Catalyst/charge ratio by weight: | c/o = 3.0 |
| WHSV: | 15 h$^{-1}$ |
| Time or stream reaction: | 75 s |
| Reactor temperature: | 480° C. |
| Charge: | |
| Density at 15° C.: | 0.904 |
| Aniline point: | 79° C. |
| S weight %: | 1.3 |
| N weight % | <0.1 |
| Conradson carbon % by weight: | 0.32 |
| Ni + V ppm | <1 |
| | I.P. = 202° C. |
| | 10% = 307° C. |
| ASTM D 1160 | 50% = 402° C. |
| | 90% = 510° C. |
| | F.P. — |

The following results are obtained:
Conversion rate: 72.3%
C$_5$+ gasoline yield: 53.4%
C$_4$=/C$_4$ ratio: 1.2
Coke % by weight with respect to the catalyst: 2.0

With catalyst B, in the same conditions as for catalyst A, the following results are obtained:
conversion %: 73.3%
C$_5$+ gasoline yield: 54.4%
C$_4$=/C$_4$ ratio: 1.2
Coke % by weight with respect to the catalyst: 2.1

Finally, with catalyst A$_1$ (comparative), the results are:
conversion %: 71.8%
Yield to C$_5$+ gasoline: 53.1%
C$_4$=/C$_4$ ratio: 1.2
Coke % by weight with respect to the catalyst: 2.3

What is claimed as the invention is:

1. In a catalytic process for cracking a hydrocarbon charge comprising subjecting a hydrocarbon charge to cracking conditions in the presence of a catalyst, the improvement wherein the catalyst contains by weight:

(a) about 50 to 95% of a matrix selected from the group consisting of at least one of alumina, clay, silica, silica-alumina, alumina-boron oxide, magnesia, silica-magnesia, zirconia and titanium oxide, and characterized by the following textural properties:

TPV (Total Pore Volume) ≧ 0.4 cm$^3$/g
S (Specific Surface) ≧ 100 m$^2$/g
PV$_{75}$ (Volume of pores with diameter greater than 7.5 nm) ≧ 0.25 cm$^3$/g
PV$_{75}$/TPV ≧ 0.5

(b) about 5 to 50% of a zeolite characterized by:
a SiO$_2$/Al$_2$O$_3$ molar ratio from about 8 to 70,
a sodium content lower than 0.15% by weight, determined on a zeolite roasted at 1100° C.,
a parameter a of unit cell size ranging from 24.55 × 10$^{-10}$ m to 24.24 × 10$^{-10}$ m,
a sodium ion uptake capacity, expressed in grams of sodium per 100 grams of neutralized and roasted zeolite, higher than about 0.85, a specific surface higher than about 400 m²/g,
a steam adsorption capacity at 25° C. (at a ratio between the water partial pressure and the saturation vapor pressure of water at 25° C. $P/P_o$ of 0.10) higher than 6% by weight,
a pore distribution such that from 1 to 20% of the pore volume is pores of diameter ranging from 20 to $80 \times 10^{-10}$ m, the remaining pore volume being essentially pores of diameter lower than $20 \times 10^{-10}$ m.

2. A process according to claim 1, wherein the catalyst contains, by weight:
  (a) about 50 to 95% of a matrix characterized by the following textural properties:
  $TPV \geq 0.5$ cm³.g⁻¹
  $S \geq 150$ m².g⁻¹
  $PV_{75} \geq 0.35$ cm³.g⁻¹
  $PV_{75}/TPV \geq 0.6$
  (b) about 5 to 50% of a zeolite containing at least one metal selected from the group consisting of metals from the rare-earth family, rhenium, noble metals from the platinum family, manganese, iron, cobalt, nickel, and chromium.

3. A process according to claim 1, wherein the catalyst contains, by weight:
  (a) 50 to 95% of a matrix selected from the group consisting of silica-aluminas, silica-magnesias and clays, and
  (b) 5 to 50% of a zeolite.

4. A process according to claim 3, wherein the matrix further contains at least one other solid selected from the group consisting of aluminas, silicas, zirconias, alumina-boron oxide, magnesias, titanium oxide.

5. A process according to claim 3, wherein the zeolite contains at least one metal of the rare-earth family group.

6. A process according to claim 3, wherein the catalyst further contains at least one metal or compound of a metal selected from the group consisting of noble metals from the platinum family, rhenium, manganese, chromium, cobalt, nickel and iron.

7. A process according to claim 2, wherein the catalyst contains, by weight:
  (a) 50 to 95% of a matrix selected from the group consisting of silica-aluminas, silica-magnesias and clays, and
  (b) 5 to 50% of a zeolite.

8. A process according to claim 7, wherein the matrix further contains at least one other solid selected from the group consisting of aluminas, silicas, zirconias, alumina-boron oxide, magnesias, titanium oxide.

9. A process according to claim 2, wherein the zeolite contains at least one metal of the rare-earth family group.

10. A process according to claim 9, wherein the catalyst further contains at least one metal or compound of a metal selected from the group consisting of noble metals from the platinum family, rhenium, manganese, chromium, cobalt, nickel and iron.

11. A process according to claim 1, wherein said cracking process is conducted at conditions of WHSV (weight hourly space velocity) of 15 h⁻¹, reactor temperature of 480° C., reaction duration of 75s, and wherein the hydrocarbon charge has a density at 15° C. of 0.904, an aniline point of 79° C., a Conradson carbon content of 0.32% by weight, a total metals content of nickel and vanadium of less than 1 ppm, a content of sulfur of 1.3% by weight and a content of nitrogen of less than 0.1% by weight.

12. A process according to claim 1, wherein the zeolite has a pore distribution such that 3–15% of the pore volume is pores having a diameter of 20 to $80 \times 10^{-10}$ m, the remaining pore volume being essentially pores having a diameter less the $20 \times 10^{-10}$ m.

13. A process according to claims 1, wherein the zeolite contains no mesopores of a diameter greater than $80 \times 10^{-10}$ m.

* * * * *